United States Patent [19]

Matsushita

[11] Patent Number: 5,799,845
[45] Date of Patent: Sep. 1, 1998

[54] LUGGAGE COMPARTMENT CONSTRUCTION

[75] Inventor: Yasuhiro Matsushita, Hamamatsu, Japan

[73] Assignee: Suzuki Motor Corporation, Hamamatsu, Japan

[21] Appl. No.: 713,230

[22] Filed: Sep. 12, 1996

[30] Foreign Application Priority Data

Jan. 19, 1996 [JP] Japan .................... 8-006986

[51] Int. Cl.$^6$ ............... B62D 43/10; B60R 11/00
[52] U.S. Cl. ............ 224/42.14; 224/42.2; 224/42.24; 224/541; 224/542; 296/37.2
[58] Field of Search .................. 224/42.13, 42.14, 224/42.12, 42.2, 42.24, 42.23, 539, 541, 542; 296/37.2, 37.3

[56] References Cited

U.S. PATENT DOCUMENTS 5,429,285  7/1995  Kim .......................... 224/42.14
5,586,698  12/1996  Satoh ........................ 224/42.13

FOREIGN PATENT DOCUMENTS 2705071  11/1994  France ..................... 224/42.14
4103652   8/1992  Germany ................. 224/42.13
 624211   9/1994  Japan ........................ 296/37.2

*Primary Examiner*—Linda J. Sholl
*Attorney, Agent, or Firm*—Bell Seltzer Intellectual Property Law Group of Alston & Bird LLP

[57] ABSTRACT

The present invention provides a luggage compartment construction comprising a spare tire house for containing a spare tire, which is provided under a luggage compartment by depressing a floor panel, and a spare tire cover for covering an opening of the spare tire house, wherein a floor forming member having a step is provided at the periphery of the opening of the spare tire house, a tray is disposed under the spare tire cover, and the periphery of the tray is placed and fixed on the step of the floor forming member.

4 Claims, 4 Drawing Sheets

1

LUGGAGE COMPARTMENT CONSTRUCTION

FIELD OF THE INVENTION AND RELATED ART STATEMENT

The present invention relates to a luggage compartment construction applied to a four-wheeled automobile.

A luggage compartment (trunk room or luggage room) 51 for carrying luggage has conventionally been provided at the rear part of a vehicle body for a four-wheeled automobile as shown in FIGS. 7 and 8. Under the luggage compartment 51, a spare tire housing 54 for containing a spare tire 53 of T type tire is provided by depressing a rear floor panel 52. On top of the spare tire housing 54, a spare tire cover 55 of a flat plate shape, which constitutes a luggage floor, is placed to cover the opening 54a of the spare tire housing 54. A space over the spare tire cover 55 is used as a luggage (trunk) space. In FIG. 8, reference numeral 56 denotes a spare tire holder for fixing the spare tire 53.

Over the aforementioned spare tire 53, which is a T type tire, a tray 57, made of resin and having a concave 57a, is mounted. Therefore, the conventional luggage compartment 51 is provided with sub-trunks 58 formed by covering with the spare tire cover 55 placed from the upside of the tray 57, so that small articles can be contained in the sub-trunks 58.

However, in the above-described conventional luggage compartment construction, since the tray 57 is placed over the spare tire 53 as shown in FIG. 8, if it is attempted to contain a spare tire of normal tire, which is wider than the T type tire, in the spare tire housing 54, the tray 57 is lifted and cannot be placed between the spare tire 53 and the spare tire cover 55. Also in the conventional luggage compartment construction, a lot of dead space S is formed by a wheel 53a of the spare tire 53, so that the sub-trunks 58 of the tray 57 have a less capacity. Therefore, the space in the spare tire housing 54 is not utilized fully, and the sub-trunks 58 are used less frequently, resulting in low usefulness.

OBJECT AND SUMMARY OF THE INVENTION

The present invention was made in view of the above situation. Accordingly, an object of the present invention is to a luggage compartment construction in which a tray can be contained reliably without regard to the type of spare tire contained in a spare tire housing, and a space in the spare tire housing can be utilized effectively by the presence of the tray.

To solve the above problems the prior art has, the present invention provides a luggage compartment construction comprising a spare tire housing for containing a spare tire, which is provided under a luggage compartment by depressing a floor panel, and a spare tire cover for covering an opening of the spare tire housing, wherein a floor forming member having a step is provided at the periphery of the opening of the spare tire housing, a tray is disposed under the spare tire cover, and the periphery of the tray is placed and fixed on the step of the floor forming member.

As described above, in the luggage compartment construction in accordance with the present invention, which comprises a spare tire housing for containing a spare tire, which is provided under a luggage compartment by depressing a floor panel, and a spare tire cover for covering an opening of the spare tire housing, a floor forming member having a step is provided at the periphery of the opening of the spare tire housing, a tray is disposed under the spare tire cover, and the periphery of the tray is placed and fixed on the step of the floor forming member. Therefore, the tray can be used by being contained reliably in the spare tire housing without regard to the spare tire type, normal tire or T type tire, and the space in the spare tire housing can be utilized effectively, providing a great convenience.

DETAILED DESCRIPTION OF PREFERRED EMBODIMENT

Figure 1:
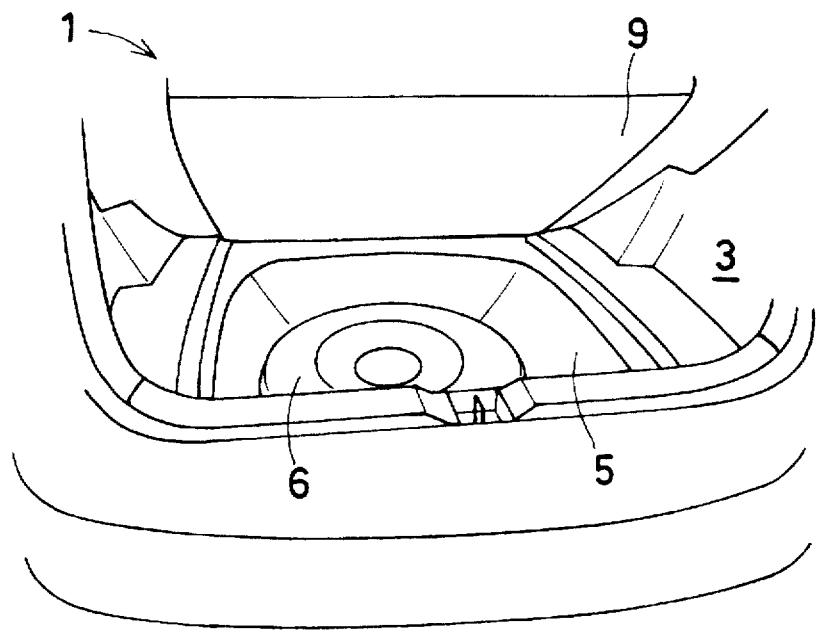
FIG. 1 is a perspective view the inside of a spare tire housing for a four-wheeled automobile to which a luggage compartment construction in accordance with an embodiment of the present invention is applied, viewed from the rear of the vehicle body.

The present invention will be described in detail with reference to an embodiment shown in the drawings.

FIGS. 1 to 6 show an embodiment of a luggage compartment construction in accordance with the present invention. In these figures, reference numeral 1 denotes a four-wheeled automobile to which a luggage compartment construction of this embodiment is applied. A luggage compartment 3 for containing luggage is provided at a vehicle body rear part 2 of the automobile 1. Under the luggage compartment 3, a spare tire housing 5, which is a concave for attaching a spare tire, is formed by a floor panel 4 which is deep drawn and depressed downward, so that a spare tire 6 is contained in the spare tire housing 5. The spare tire 6 in the spare tire housing 5 is fixed to a bracket 8 by a spare tire holder 7 consisting of a fastening screw etc.

Figure 2:
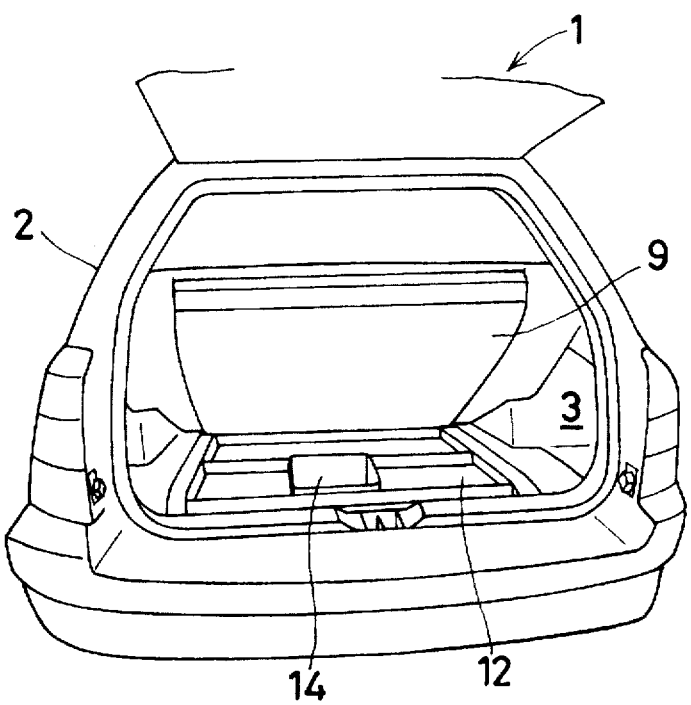
FIG. 2 is a perspective view showing a state in which a spare tire cover used for the luggage compartment construction is lifted.
Figure 3:
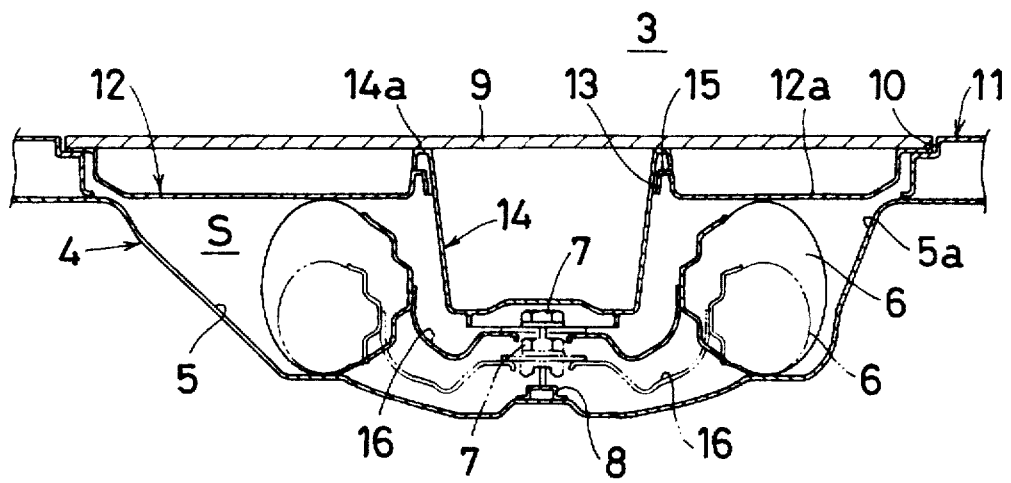
FIG. 3 is a sectional view of a spare tire housing to which the luggage compartment construction is applied.
Figure 4:
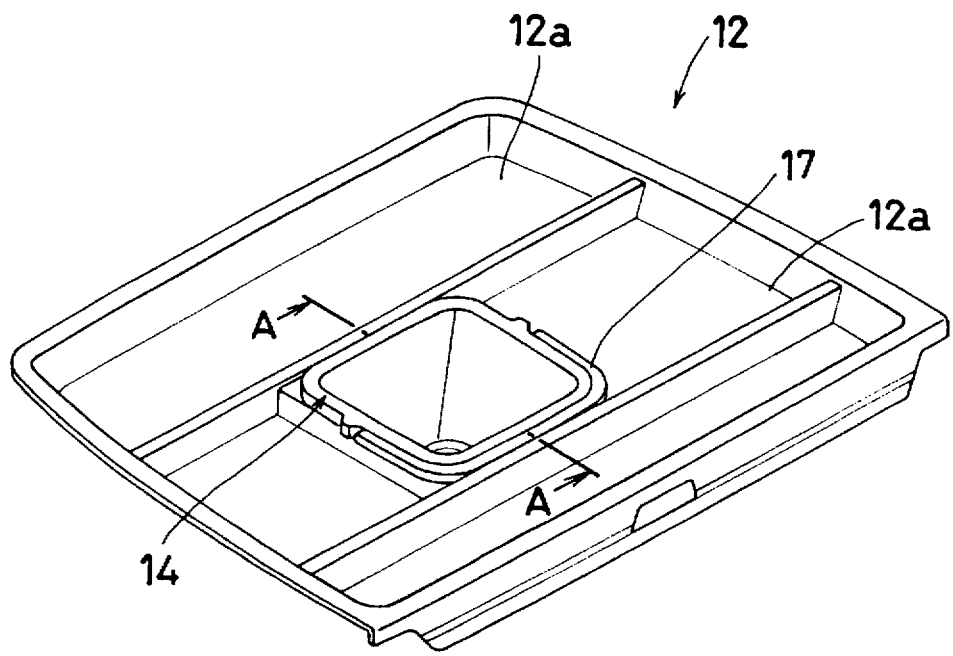
FIG. 4 is a perspective view of a tray used for the above-mentioned luggage compartment construction.
Figure 5:
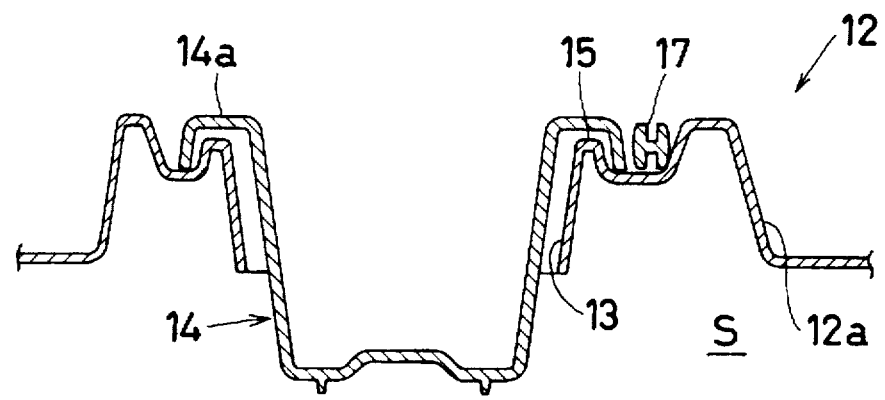
FIG. 5 is a sectional view taken along the line A—A of FIG. 4.

Over the spare tire housing 5, as shown in FIGS. 1 to 3, a spare tire cover 9 is disposed, so that an opening 5a of the spare tire housing 5 is covered by the spare tire cover 9. Moreover, as shown in FIG. 3, a floor forming member 11 having a step 10 is provided at the periphery of the opening 5a of the spare tire housing 5, so that the upper face of the floor panel 4 is raised by the floor forming member 11. The step 10 of the floor forming member 11 is formed at a height such that the upper surface of the spare tire cover 9 is substantially flush with the upper surface of the floor forming member 11 when the spare tire cover 9 and a tray, mentioned later, are mounted.

Under the spare tire cover 9, a tray 12, made of resin and having a plurality of divided concaves 12a, is disposed. The periphery of the tray 12 is placed on the step 10 of the floor forming member 11 and fixed by being pressed by the spare tire cover 9. Also, as shown in FIGS. 3 to 6, a containing hole 13 of a substantially square shape is formed at the center of the tray 12. A bottomed bucket-type box (container) 14, which is used as a container, is disposed in the containing hole 13 so as to be singly removable from the upside.

For this purpose, positioning bosses 15 protruding upward are provided at the periphery of the containing hole 13. The bucket-type box 14 is installed to the tray 12 in a state of being positioned by fitting a flange 14a of the bucket-type box 14 to the bosses 15.

The bucket-type box 14, which usually forms part of the tray 12 and can be removed when being used as a container, is formed into a deep bottomed box reaching a wheel 16 of the spare tire 6 in order to increase the capacity thereof. Therefore, the lower part of the bucket-type box 14 is disposed in the wheel 16 of the spare tire 6. The bucket-type box 14 is provided with a handle 17 for convenience of removal. In FIG. 3, the spare tire 6 indicated by a solid line denotes a normal tire, while the spare tire 6 indicated by a chain line denotes a T type tire.

Figure 6:
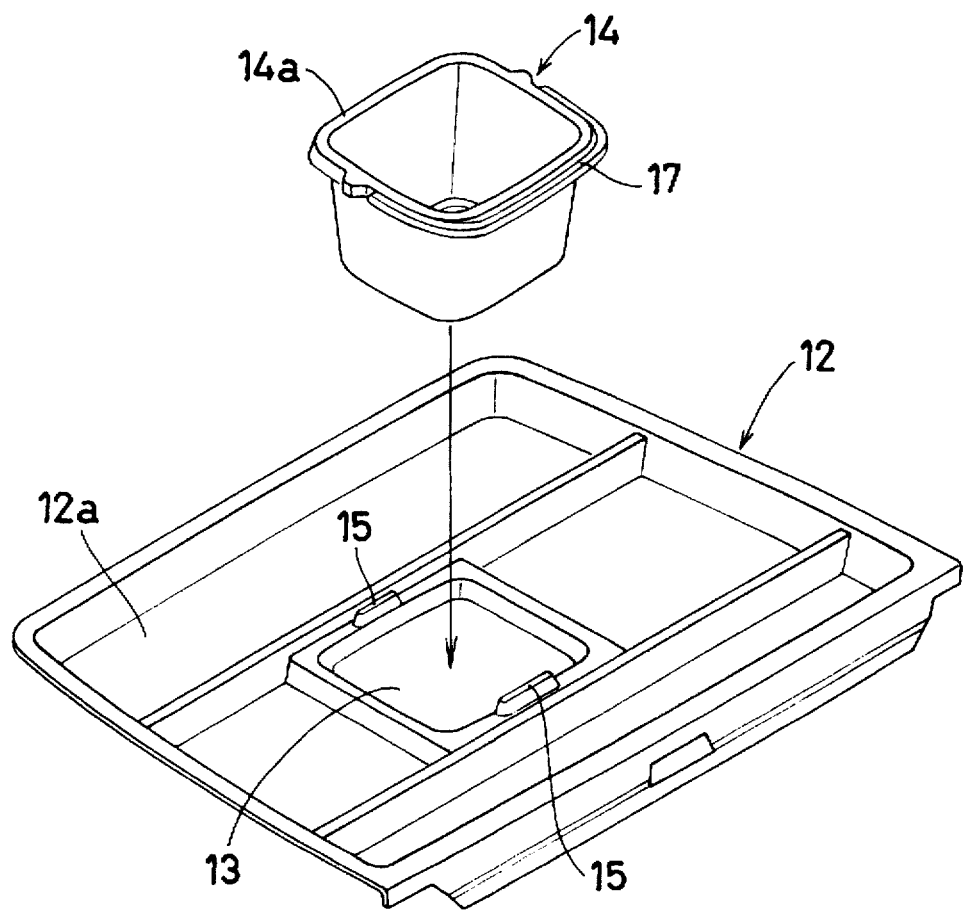
FIG. 6 is a perspective view showing a state just before a bucket-type box is arranged in a containing hole in the tray shown in FIG. 4.
Figure 7:
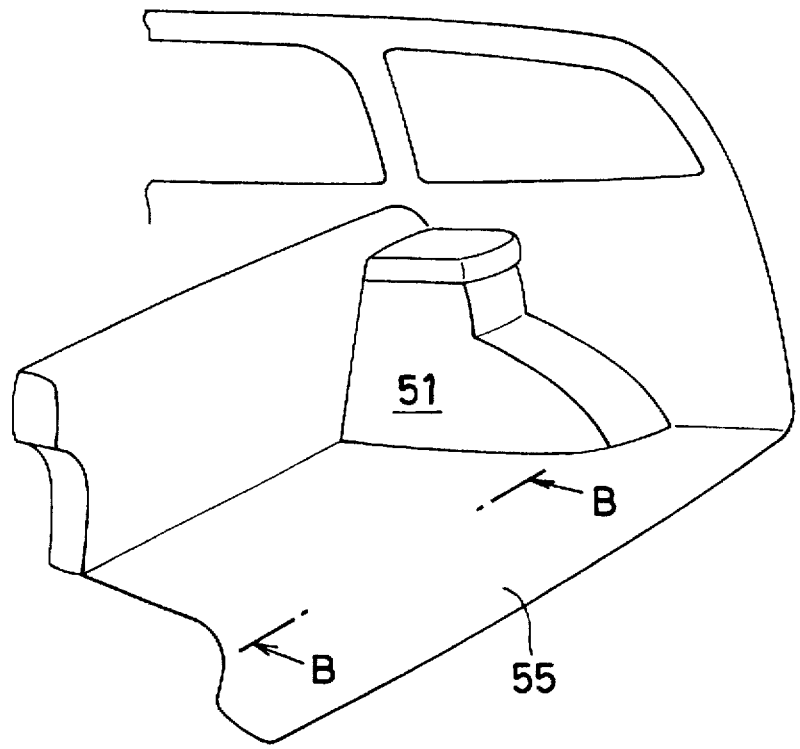
FIG. 7 is a perspective view of a luggage compartment for a four-wheeled automobile illustrating aspects of related prior art luggage compartment constructions.
Figure 8:
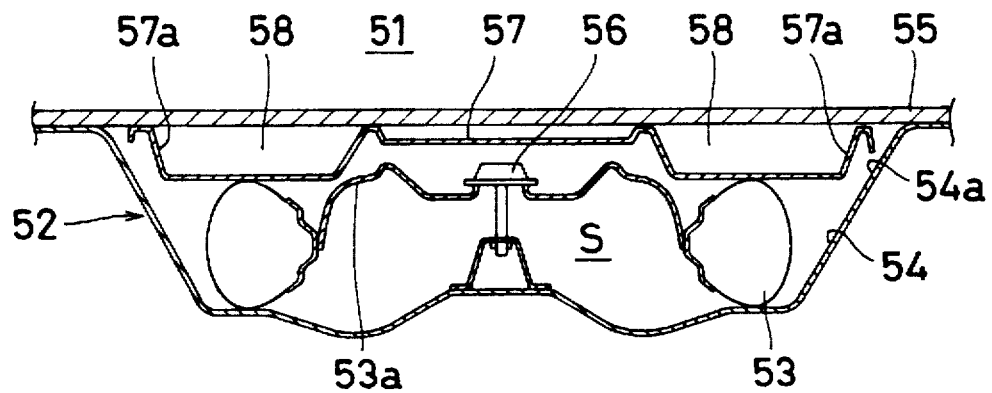
FIG. 8 is a sectional view taken along the line B—B of FIG. 7.

In the luggage compartment construction of this embodiment, when small articles are put into a space S in the spare tire housing 5, the rear end of the spare tire cover 9 is first turned and raised as shown in FIG. 2 to expose the tray 12. Small articles are put into the concaves 12a of the tray 12 and the bucket-type box 14. Then, the spare tire cover 9 is lowered and the periphery thereof is placed on the step 10 of the floor forming member 11, by which the spare tire cover 9 is returned to the original state with the lower part of the luggage compartment 3 being a flat surface. When the small articles contained in the bucket-type box 14 is removed, the tray 12 is exposed by the above procedure. Then, the bucket-type box 14 is lifted from the tray 12 by holding the handle 17 to remove the small articles in the box. Thereafter, as shown in FIG. 6, the bucket-type box 14 is put into the containing hole 13 of the tray 12, the spare tire cover 9 is lowered and returned to the original state with the lower part of the luggage compartment 3 being a flat surface by the above procedure (refer to FIG. 3).

In the luggage compartment construction of this embodiment, the tray 12 is not placed on top of the spare tire 6 as with the conventional construction, but the tray 12 and the periphery of the spare tire cover 9 are placed and fixed on the step 10 of the floor forming member 11. Therefore, the tray 12 can be contained reliably in the spare tire housing 5 without regard to the type (normal tire and T type tire) of the spare tire 6. Also, in the luggage compartment construction of this embodiment, the bucket-type box 14 can be removed singly without removing the tray 12, so that small articles can be put in and out conveniently, achieving very high usefulness. Moreover, the bucket-type box 14 is formed into a deep shape reaching the wheel 16 of the spare tire 6, and the lower part thereof is contained in the wheel 16 of the spare tire 6. Therefore, large-sized (or many) small articles can be contained, and the dead space produced by the wheel 16 of the spare tire 6 can be utilized effectively.

Although one embodiment of the present invention has been described above, the present invention is not limited to the above-described embodiment. Various changes and variations may be made based on the technical concept of the present invention. For example, the shapes of the containing hole 13 of the tray 12 and the bucket-type box 14 are not limited to those shown in this embodiment, but circular and bottomed cylindrical shapes may be used.

I claim:

1. A luggage compartment construction, comprising:
   a luggage compartment having a floor;
   a spare tire housing underneath said luggage compartment and defined by a depression in said luggage compartment floor, said spare tire housing having an opening at the top thereof;
   a spare tire cover covering said opening;
   said spare tire housing additionally comprising a step surface at the periphery of said housing, said step surface being defined by a substantially horizontal surface disposed at lower elevation relative to said floor of said luggage compartment; and
   a tray disposed underneath said spare tire cover, the periphery of said tray being supported by said step surface.

2. A luggage compartment construction according to claim 1, further comprising a spare tire positioned in the spare tire housing, said spare tire comprising a wheel.

3. A luggage compartment construction according to claim 2, wherein said tray comprises a removable container dimensioned to extend vertically into said wheel of said spare tire.

4. A luggage compartment construction according to claim 3, wherein said removable container is centrally positioned in said tray.

* * * * *

UNITED STATES PATENT AND TRADEMARK OFFICE
CERTIFICATE OF CORRECTION

PATENT NO. : 5,799,845
DATED : September 1, 1998
INVENTOR(S) : Matsushita

It is certified that error appears in the above-identified patent and that said Letters Patent is hereby corrected as shown below:

On title page, item [56],

In the References Cited, FOREIGN PATENT DOCUMENTS, line 3, "624211" should be --6-247211--.

Signed and Sealed this

First Day of December, 1998

Attest:

BRUCE LEHMAN

Attesting Officer

Commissioner of Patents and Trademarks